March 12, 1963 E. L. WARNER 3,081,392
HIGH-FREQUENCY OVEN
Filed Feb. 24, 1955 3 Sheets-Sheet 1

INVENTOR.
ELMER L. WARNER
BY Oberlin & Limbach
ATTORNEYS

March 12, 1963 E. L. WARNER 3,081,392
HIGH-FREQUENCY OVEN
Filed Feb. 24, 1955 3 Sheets-Sheet 2

INVENTOR.
ELMER L. WARNER
BY
Oberlin & Limbach
ATTORNEYS

March 12, 1963 — E. L. WARNER — 3,081,392
HIGH-FREQUENCY OVEN
Filed Feb. 24, 1955 — 3 Sheets-Sheet 3

INVENTOR.
ELMER L. WARNER
BY Oberlin & Limbach
ATTORNEYS

United States Patent Office 3,081,392
Patented Mar. 12, 1963

3,081,392
HIGH-FREQUENCY OVEN
Elmer L. Warner, Crestline, Ohio, assignor to The
Tappan Company, a corporation of Ohio
Filed Feb. 24, 1955, Ser. No. 490,325
14 Claims. (Cl. 219—10.55)

This invention relates, as indicated, to high-frequency oven construction and, more particularly, to a microwave oven capable of browning or toasting the exterior of foodstuffs cooked principally electronically therein.

The basic form and operation of such ovens are now generally known, as is the inherent inability of high-frequency cooking to produce, in itself, browning of the materials cooked. This characteristic may seem to be a minor technical disadvantage, but it is actually one of considerable practical importance, since unbrowned dough products, meats, and the like do not appear as yet as palatable to a consumer, and some loss of flavor results, particularly in the roasting of meat.

The significance of browning is evidenced by the many proposals which have been made heretofore for providing the same in high-frequency cooking apparatus. It has, for example, been proposed to treat the food separately by conventional heating means, completely apart from the electronic cooking apparatus and stage, either before or after the latter operation. This may be feasible in commercial continuous ovens, but it is obviously impractical for home use. Another proposal has involved coating the food with a substance which absorbs the high-frequency energy more readily than the body of the food and thus provides greater heat at the surface. Similarly, the use of heat-concentrating plates or other mechanical elements has been tried. These latter schemes are not particularly desirable, however, since they all require additional materials to be used and separate operations to be performed by the user.

It is accordingly a primary object of my invention to provide a high-frequency oven characterized by the incorporation of means effective to produce browning without unduly complicating the structure or manner of use thereof.

Another object is to provide an inexpensive browning element employed in novel manner within a cooking cavity supplied with high-frequency electromagnetic energy.

It is also an object of the invention to provide an oven with both conventional and high-frequency electronic heating means and cooling means for extracting heat from the space immediately about the oven.

An additional object is to control the operation of such conventional heating means and cooling means to insure that the latter is operative during the heat-producing periods of the former.

Other objects and advantages of the invention will become apparent as the following description proceeds.

To the accomplishment of the foregoing and related ends, the invention, then, comprises the features hereinafter fully described and patricularly pointed out in the claims, the following description and the annexed drawings setting forth in detail certain illustrative embodiments of the invention, these being indicative, however, of but a few of the various ways in which the principle of the invention may be employed.

Figure 1:
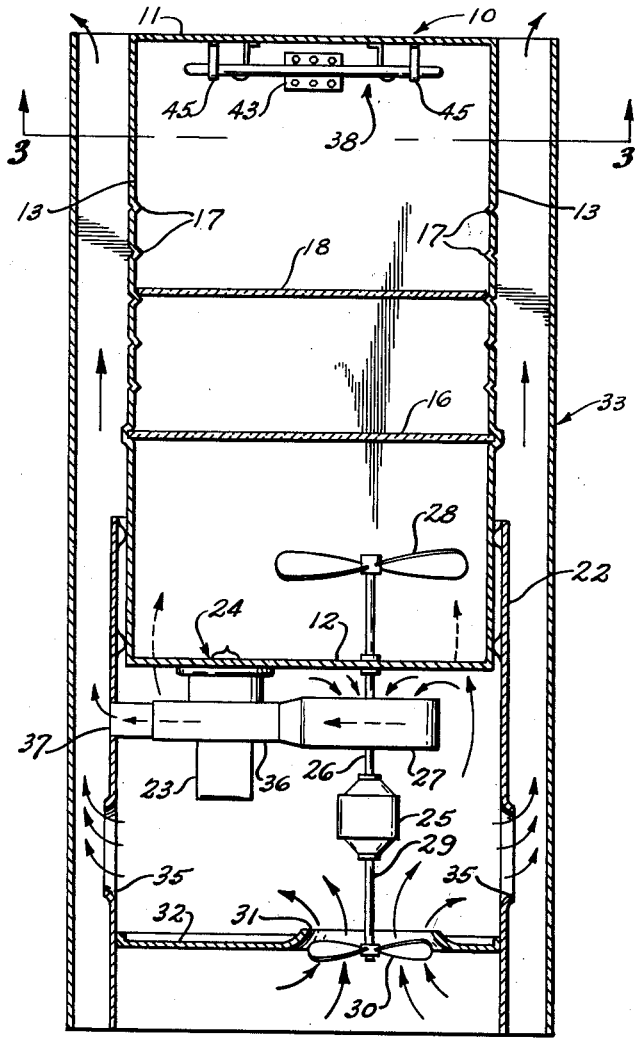
FIG. 1 is a transverse sectional view of oven construction in accordance with the invention.

Referring now to the drawings in detail, the oven proper, generally designated by reference numeral 10, comprises a top wall 11, bottom wall 12, side walls 13, front wall 14, and rear wall 15, all made of relatively thin metal. Supported within this metallic enclosure, at a point spaced a predetermined distance above the bottom wall 12, is a plate 16 made of a suitable plastic or other dielectric material which is substantially transparent to high-frequency energy.

Side walls 13 of the oven above the plate 16 are formed with corresponding, vertically-spaced integral glides 17 adapted to receive and support a tray 18 at various elevations. This tray is also made of a low-loss material substantially transparent to high-frequency energy and is adapted to receive the food to be cooked, either in suitable containers or not.

The front wall 14 of the oven above the plate 16 has an opening 19 formed therein for access to the oven interior, and a hinged door 20 is provided for closing the same. The body of the door is preferably formed of a reticulated metal plate 21, the openings of which are of such size in relation to the wavelength of the high-frequency energy employed as to act as a choke in well-known manner. Passage of such energy through the door is thereby precluded.

The lower or bottom portion of the oven is received within a support housing 22, the nested sections of the two being suitably joined, for example by welding. A magnetron 23 of known construction is mounted within the housing to deliver electromagnetic energy to the oven at a region 24 of the bottom wall 12. Also mounted within the housing 22 is an electric motor 25 having a first drive shaft 26 connected to drive a blower 27 and a mode-changer or stirrer in the form of a propeller 28. The latter is disposed in the space between the oven bottom 12 and the plate 16 and functions, as indicated, to stir or produce periodic change in the field established within the oven. Reference may be had to Patent No. 2,618,735, dated November 18, 1952, for a complete description of this type of high-frequency energy supply.

A second shaft 29 of the motor extends downwardly and has mounted thereon a fan member 30 which is disposed in an opening 31 of a horizontal partition 32. This fan assembly is adapted to draw air upwardly therethrough and into the space occupied by the magnetron and motor, and the lower front portion of the housing is preferably at least partially open to enhance the supply of air to the draft chamber.

An outer shell, designed by reference numeral 33, encloses the sides and rear of oven and housing in spaced relation to provide passages for the circulation of air against the oven walls. Housing 22 is formed with apertures 35 in its side walls for the flow of air to the space defined between the oven and the outer shell, the arrows indicating the direction of flow. The purpose of such circulation is, of course, to extract heat from the area immediately around the oven, this feature being of particular importance where the oven is mounted in a wall recess. There is some clearance provided, as illustrated, about the periphery of the lower portion of the oven enclosure received in housing 22, so that some air will also flow about this oven portion.

Blower 27 draws air in from the housing space within which it is mounted and forces the same through a conduit 36 disposed about the magnetron for cooling of the same. This air is then exhausted through a further opening 37 in the housing side wall.

Figure 4:
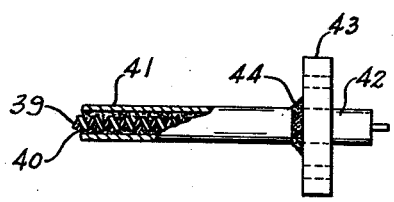
FIG. 4 is a fragmentary view to an enlarged scale of the electric heating unit employed in the oven.

In the extreme upper portion of the oven, I dispose an electric heating unit, indicated generally at 38, in the form of a sinuously arranged member of considerable length. As shown most clearly in FIG. 4, the member includes coiled resistance element 39, a mass of suitable insulating material 40, such as magnesium oxide, and a continuous outer sheath 41 of highly conductive metal spaced from and thereby out of contact with the heating coil. It is to be noted that this unit is within the cavity in which the high-frequency field is established. The heating coil is, however, shielded from such energy by the sheath, which is, in effect, reflective of the waves in the oven similarly as the walls, as a result of the relatively large dimensions thereof compared to the wavelength of the high-frequency oscillations.

Such arrangement, however, requires an extremely good bond between the sheath and the oven to avoid arcing at the regions of contact, due to potential difference across any small gaps which might be present. For the same reason, the glides are integrally formed, separate attachment of the same presenting similar problems of arcing. Welding or soldering the sheath to the oven wall is possible to insure the required contact, but to facilitate field installation, I prefer to attach the terminal portions 42 of the unit to a separate plate 43 which may then be firmly bolted to overlie an opening provided in the oven rear wall for passage of the terminals therethrough. A very efficient bonding between the sheath end portions and such plate is obtained by silver solder, indicated at 44, and it will be appreciated that the flat plate overlying the wall around such opening also provides a good contact. In this manner, the job of attaching the cylindrical sheath ends directly to the oven walls conveniently and, at the same time, with efficient electrical contact, is greatly simplified.

At selected points along the length thereof, the body of the heating unit 38 is supported by hangers or brackets 45 depending from the top oven wall 11. It is preferred that these members be welded to the wall and preferably welded or soldered to the sheath, again to eliminate the possibility of arcing. The exact number and construction of such supports are obviously variable within apparent limitations.

Figure 5:
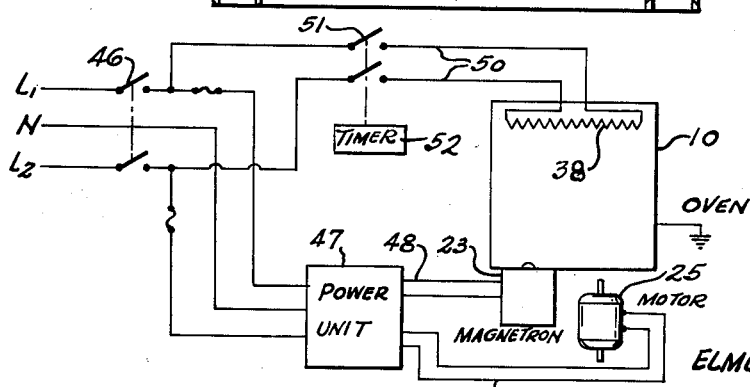
FIG. 5 is a schematic diagram of the oven control circuits.
Figure 3:
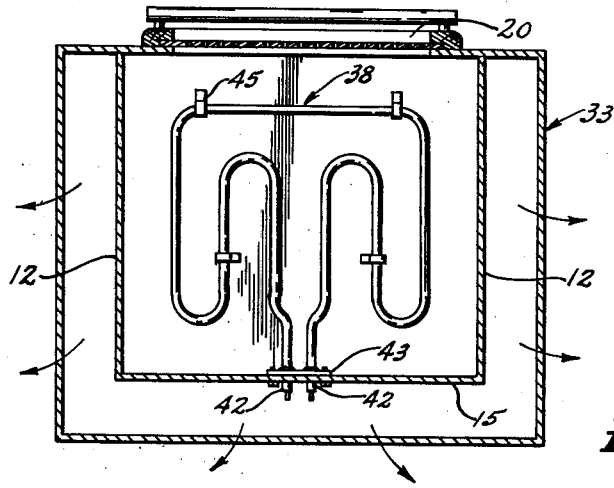
FIG. 3 is a sectional view taken on line 3—3 in FIG. 1.
Figure 2:
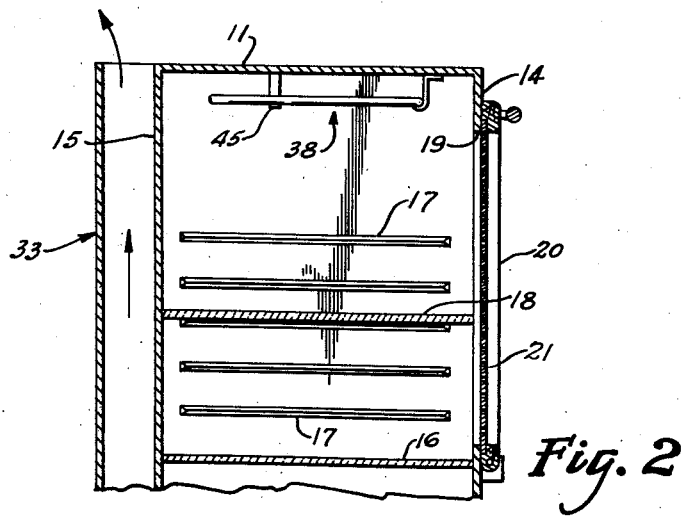
FIG. 2 is a longitudinal sectional view thereof.

The unit 38 is intended to provide thermal heat, upon connection to a conventional source of supply, which will afford toasting or browning of food treated in the oven. It is preferred, in order to avoid possible overheating, that the unit be energized only during the periods of energization of the motor, so that the air circulation previously described is effective for cooling purposes whenever the unit is operative. This end is accomplished by the control system of FIG. 5. As there shown, the three-wire conventional supply, comprising the wires $L_1$, N, and $L_2$, includes a main switch 46 operative to connect and disconnect all the subsequent circuits. One such latter circuit comprises a power pack 47 of conventional type to which the three supply lines extend with switch 46 closed and having a first output circuit 48 for energizing the magnetron and a second output circuit 49 for energizing the motor.

The resistance unit 38 is connected by wires 50 to the lines $L_1$ and $L_2$ at the control side of main switch 46, and it will accordingly be seen that this unit cannot be energized until, and for as long as, switch 46 is closed with consequent energization of the motor and operation of the fan assembly. The supply circuit of heating unit 38 includes a switch 51 which may either be manually operated or controlled by a suitable timer 52. The timer may be of any commercially available type adapted preferably for delay timing, whereby the period of browning may coincide with but a portion of the electronic cooking period. For example, the food may be cooked electronically until substantially done and then the resistance unit energized by the timer for browning in the remaining cooking time.

Figure 6:
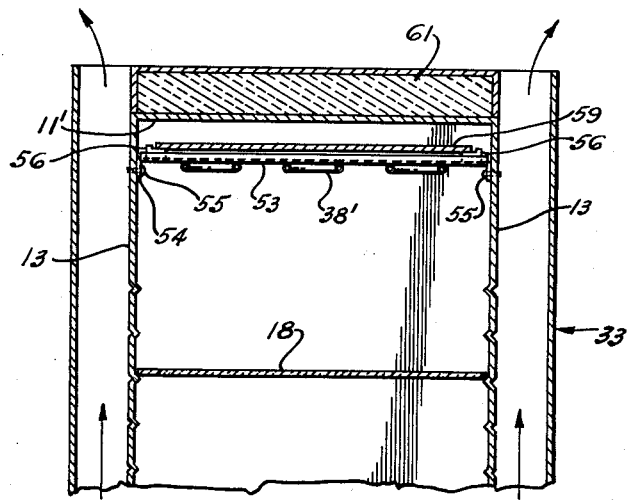
FIG. 6 is a sectional view of the oven top illustrating a slightly modified form of mounting the electrical heating unit.
Figure 7:
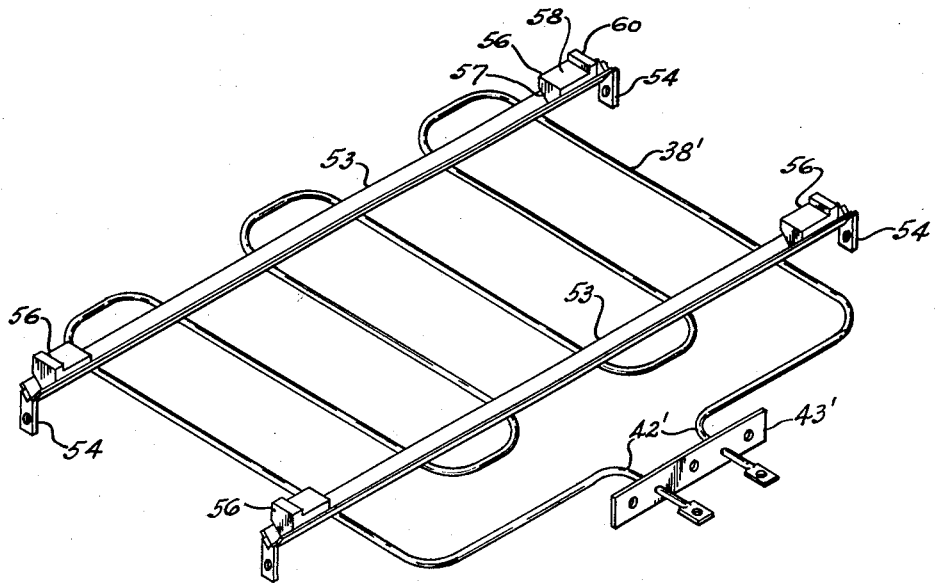
FIG. 7 is an enlarged perspective view of the heating unit and mounting assembly shown in FIG. 6.

The modified form of browning unit 38' illustrated in FIGS. 6 and 7 comprises an electric resistance element of grid form and of the same specific nature as the one previously set forth. Here, however, the element is mounted in the top portion of the oven by means of two V-shaped rails 53 extending substantially horizontally between the oven side walls 13, with the open sides thereof uppermost. The rails overlie the convolutions of the element and the latter are secured to the rails at each point of contact by welding, such welds, of course, joining the sheath and the rails. Downturned tabs 54 are formed at the ends of the rails and are secured tightly to the oven side walls by screw-fasteners 55, thereby to support the rails and hence the resistance unit.

Terminal portions 42' of the resistance member are secured by welding or silver-soldering of the outer sheath to attaching plate 43', similar to the plate 43 in the first form of browning unit and likewise being adapted to be bolted to the rear wall of the oven. Like this plate, the rails tabs 54 overlie an appreciable extent of the oven walls, so that, with tight attachment, good electrical contact is obtained. In such modified form of mounting, the sheath of the electric resistance unit is, therefore, similarly an effective continuation of the walls of the high-frequency cavity and reflective at the wavelengths employed.

The two rails 53 also mount ceramic blocks 56 having lower V-shaped portions 57 which nest in the rails and flat upper surfaces 58 spaced above the upper edges of the rails. In the construction illustrated, four such blocks are provided with one located in each rail end region. Supported on the flat surfaces of the blocks is a thin metal sheet 59 of slightly less area than the oven so as to be spaced from the oven walls at all sides. To insure against accidental dislodgement to either side, with resultant contact between the sheet and the side walls of the oven, the blocks are provided with raised flanges 60 at their ends adjacent such side walls.

Sheet 59 is merely laid on the blocks so that it may very easily be removed from the oven for cleaning. The sheet or plate serves both to reflect downwardly the thermal heat produced by the browning unit, for improved efficiency, and also protects the top of the oven from undue heating. In this latter connection, insulating material 61 may be disposed to overlie the top wall 11', to preclude passage of heat to surrounding structure.

In operative position, the reflector sheet or plate 59 is completely insulated from the oven walls. Due to its large size, it is not tunable to the frequency of the oscillations developed in the oven and accordingly does not appreciably absorb microwave energy. The plate has now resistance, so that such eddy currents as may be induced therein produce negligible heating. As indicated earlier, unit 38' is of the sheathed type set forth earlier and the construction of the oven, apart from the features specifically mentioned, is the same in the modified arrangement as in the first disclosed form of the invention. This applies as well to the control system of FIG. 5, in both cases a cooling air flow being established with energization of the resistance unit depend upon the existence of such flow.

Other modes of applying the principle of the invention may be employed, change being made as regards the details described, provided the features stated in any of the following claims, or the equivalent of such, be employed.

I therefore particularly point out and distinctly claim as my invention:

1. A high frequency oven for use in food preparation, comprising a metallic enclosure adapted to receive food to be cooked, a radiant heating unit mounted in spaced relation within the upper portion of said enclosure for surface browning of the food, said unit comprising a resistance element of considerable length and a closely-surrounding sheath made of highly conductive material, means providing good electrical contact of limited extent between the sheath and the enclosure, and means for producing high frequency electromagnetic waves in and throughout the enclosure including that portion in which the radiant heating unit is disposed.

2. A high frequency oven for use in food preparation, comprising a metallic enclosure adapted to receive food to be cooked, a radiant heating unit mounted in spaced relation within the upper portion of said enclosure for surface browning of food, said unit comprising a resistance element of considerable length and a closely-surrounding sheath made of highly conductive material, means conductivel ybonding the ends of said sheath to the enclosure, the ends of said resistance element penetrating the enclosure within such bonded joints for connection to a conventional source of electric energy, and means for producing high frequency electromagnetic waves in and throughout the enclosure including that portion in which the radiant heating unit is disposed.

3. A high frequency oven for use in food preparation, comprising a metallic enclosure adapted to receive food to be cooked, a radiant heating unit mounted in spaced relation within the upper portion of said enclosure for surface browning of the food, said unit comprising a resistance element of considerable length and a closely-surrounding sheath made of highly conductive material, connecting means joining the sheath to the enclosure at a plurality of predetermined points for support of the same, said connecting means being conductive and providing good electrical contact between the sheath and enclosure, and means for producing high frequency electromagnetic waves in and throughout the enclosure including that portion in which the radiant heating unit is disposed.

4. A high frequency oven for use in food preparation, comprising a metallic enclosure adapted to receive food to be cooked, a radiant heating unit mounted in spaced relation within the upper portion of said enclosure for surface browning of the food, said unit comprising a resistance element of considerable length and a closely-surrounding sheath of highly conductive material, means for producing high frequency electromagnetic waves in and throughout the enclosure including that portion in which the radiant heating unit is disposed, and blower means arranged and operative to circulate air into contact with the exterior of the enclosure for cooling of the same.

5. A high frequency oven for use in food preparation, comprising a metallic enclosure adapted to receive food to be cooked, a radiant heating unit mounted in spaced relation within the upper portion of said enclosure for surface browning of the food, said unit comprising a resistance element of considerable length and a closely-surrounding sheath made of highly conductive material, means for producing high frequency electromagnetic waves in and throughout the enclosure including that portion in which the radiant heating unit is disposed, blower means arranged and operative to circulate air into contact with the exterior of the enclosure for cooling of the same, and control means for so determining energization of the radiant heating unit and blower means that the former is energizable only if the latter is operative.

6. A high frequency oven comprising top, bottom, and side walls of metal defining a heating cavity, a sinuous radiant heating device including a resistance element and a closely-surrounding metal sheath, means supporting said device in spaced relation beneath the top wall of such cavity, a source of high frequency energy, means for radiating said energy into the cavity to produce electromagnetic waves in and throughout the cavity including the region in which the radiant heater is supported, and a door in a side wall of the cavity affording access to the interior thereof.

7. A high frequency oven comprising top, bottom, and side walls of metal defining a heating cavity, a sinuous radiant heating device including a resistance element and a closely-surrounding metal sheath, means supporting said device in spaced relation beneath the top wall of such cavity, a source of high frequency energy, means for radiating said energy into the cavity to produce electromagnetic waves in and throughout the cavity including the region in which the radiant heater is supported, a door in a side wall of the cavity affording access to the interior thereof, an outer casing about the remaining cavity walls in spaced relation, and blower means for circulating air through the resultant space between the casing and cavity to extract heat from the latter.

8. A high frequency oven comprising top, bottom, and side walls of metal defining a heating cavity, a sinuous radiant heating device including a resistance element and a closely-surrounding metal sheath, means supporting said device in spaced relation beneath the top wall of such cavity, a source of high frequency energy, means for radiating said energy into the cavity through an opening provided in the bottom wall, thereby to produce electromagnetic waves in and throughout the cavity including the region in which the radiant heater is supported, a door in a side wall of the cavity affording access to the interior thereof, and a metal baffle removably supported above the radiant heating unit to reflect the heat produced thereby downwardly, said baffle being insulated from the cavity and the sheath of the radiant unit.

9. A high-frequency oven comprising top, bottom, and side walls of metal defining a heating cavity, a sinuous radiant heating device including a resistance element and a closely-surrounding metal sheath, means supporting said device in spaced relation beneath the top wall of such cavity, a source of high frequency energy, means for radiating said energy into the cavity through an opening provided in the bottom wall, thereby to produce electromagnetic waves in and throughout the cavity including the region in which the radiant heater is supported, a door in a side wall of the cavity affording access to the interior thereof, a metal baffle removably supported above the radiant heating unit to reflect the heat produced thereby downwardly, an outer casing about the remaining cavity walls in spaced relation, said blower means for circulating air through the resultant space between the casing and cavity to extract heat from the latter.

10. High frequency oven construction comprising a substantially completely closed cavity formed by walls of electrically conductive material, a metal-sheathed resistance heating unit mounted in spaced relation beneath the top wall of said cavity, a plate serving to reflect heat produced by said unit removably supported between and spaced from such top wall and the unit, a source of high frequency electromagnetic energy, and means for radiating such energy into the cavity, the resistance heating unit being within the field pattern resulting in the cavity.

11. High frequency oven construction comprising a substantially completely closed cavity formed by walls of electrically conductive material, means for radiating high frequency electromagnetic energy into said cavity, a resistance heating element of considerable length in a portion of said cavity permeated by such energy, and a continuous metal sheath enclosing said element in closely spaced relation, said sheath being electrically bonded to the cavity.

12. High frequency oven construction comprising a substantially completely closed cavity formed by walls of electrically conductive material, means for radiating high frequency electromagnetic energy into said cavity, a resistance heating element of considerable length in a portion of said cavity permeated by such energy, a continuous metal sheath enclosing said element in closely spaced relation, and attaching means securing and electrically bonding the sheath ends to the cavity, said attaching means affording enlarged areas of contact with the cavity.

13. A high-frequency oven comprising top, bottom, and side walls of metal defining a heating cavity, a sinuous radiant heating device including a resistance element and a closely-surrounding metal sheath, means supporting said device in spaced relation beneath the top wall of such cavity, means for radiating high-frequency energy into the cavity to permeate the same with such energy, including the region thereof in which the radiant heater is disposed, a door in a side wall of the cavity affording access to the interior, and a baffle insulated from the cavity and the radiant heating device mounted in spaced relation between the latter and the top wall of the cavity.

14. A high-frequency oven comprising top, bottom, and side walls of metal defining a heating cavity, a sinuous radiant heating device including a resistance element and a closely surrounding metal sheath, means supporting said device in spaced relation beneath the top wall of such cavity, means for radiating high-frequency energy into the cavity to permeate the same with such energy, including that portion thereof in which the radiant heater is disposed, a door in a side wall of the cavity affording access to the interior, a baffle removably supported above the radiant heating unit, an outer casing about the remaining cavity walls in spaced relation, and blower means for circulating air through the resultant space between the casing and cavity to extract heat from the latter.

References Cited in the file of this patent

UNITED STATES PATENTS

| | | |
|---|---|---|
| 1,751,219 | Seamon | Mar. 18, 1930 |
| 2,632,090 | Revercomb et al. | Mar. 17, 1953 |
| 2,716,694 | Schroeder | Aug. 30, 1955 |
| 2,748,239 | Long et al. | May 29, 1956 |
| 2,762,899 | Lenz | Sept. 11, 1956 |
| 2,767,298 | Fry | Oct. 16, 1956 |

FOREIGN PATENTS

| | | |
|---|---|---|
| 709,492 | Great Britain | May 26, 1954 |